No. 790,518. Patented May 23, 1905.

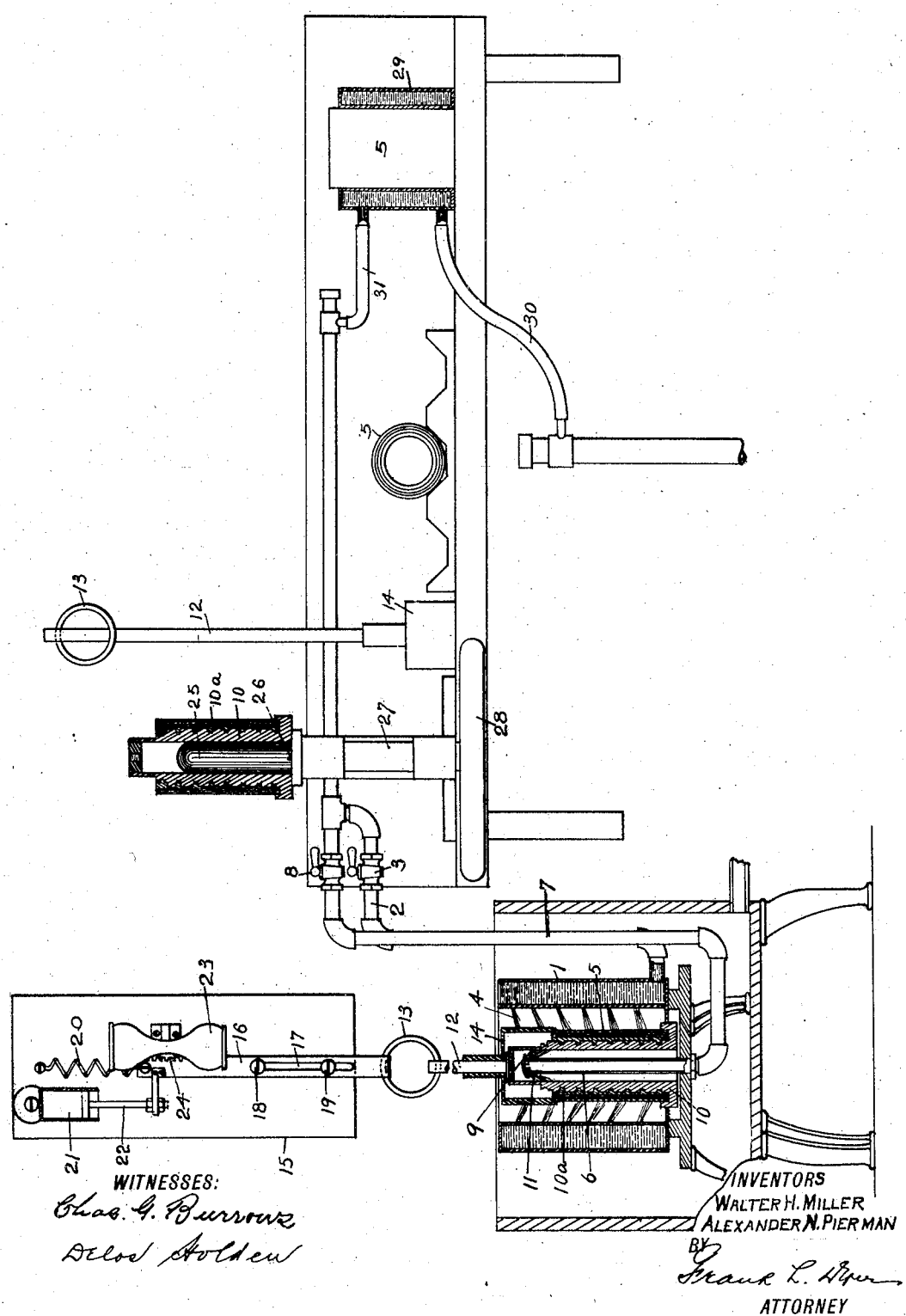

UNITED STATES PATENT OFFICE.

WALTER H. MILLER, OF ORANGE, AND ALEXANDER N. PIERMAN, OF NEW-ARK, NEW JERSEY, ASSIGNORS TO NEW JERSEY PATENT COMPANY, OF ORANGE, NEW JERSEY, A CORPORATION OF NEW JERSEY.

ART OF PRODUCING MOLDED RECORDS OR BLANKS.

SPECIFICATION forming part of Letters Patent No. 790,518, dated May 23, 1905.

Application filed May 24, 1904. Serial No. 209,569.

*To all whom it may concern:*

Be it known that we, WALTER H. MILLER, a resident of Orange, and ALEXANDER N. PIERMAN, a resident of Newark, county of Essex, State of New Jersey, citizens of the United States, have invented certain new and useful Improvements in the Art of Producing Molded Records or Blanks, of which the following is a specification.

Our invention relates to the production of molded phonograph records and blanks, and has for its object the provision of a process whereby the records and blanks may be produced cheaply and may be removed from their molds in the least possible time and with the least possible injury thereto as regards the surfaces of the said records and blanks.

In producing molded phonograph records and blanks we have found it desirable to use molds composed of a hollow core and a cylindrical matrix surrounding the same and supported thereby. This mold is introduced into a suitable bath of molten material from which the record or blank is to be formed and is then removed therefrom and allowed to cool. It is desirable in order that the records and blanks may be removed from the mold without injury to their surfaces that the mold be chilled or cooled by the application of some cooling medium, such as water. This causes the record or blank to contract, so that the core may be removed therefrom, and upon further cooling the contraction is sufficient to enable the record to be withdrawn longitudinally from the mold without the least injury to the record, which has been formed thereon by the surface of the mold. The present application relates to features whereby the said process may be performed more readily with greater economy and with less danger of injury to the records or blanks than by any other process heretofore known to us.

In the drawing which accompanies this specification we have shown in sectional elevation certain apparatus by means of which our invention may be carried out.

In practicing our invention we prefer to use a cooling device consisting of a cylindrical water jacket or tank 1, connected with a suitable water-supply by means of a pipe 2, having a valve 3 and provided on its interior surfaces with numerous small apertures through which jets of water may be discharged against the exterior surface of the mold 5. The said cooling device also comprises a vertical pipe 6, supplied with water from a pipe 7, controlled by a valve 8. The top of the pipe 6 is provided with any suitable means 9 which permit the discharge of the water against the interior of the core 10 in the form of a spray or jets 11. The mold 5 is supported by a lateral extension from the core 10. The exterior of the core is provided with a helical groove $10^a$ for producing a helical rib on the interior of the record or blank. The core is provided with an upwardly-extending rod 12, whose upper end carries a ring 13. Sleeved upon the rod 12 is a cap 14 for inclosing and centering the upper portion of the mold 5.

In the use of a cooling device such as has been described it is desirable that the heated mold be subjected to the action thereof for a definite time, which should not be too great nor yet too small. We therefore make use of a timing device by which the time during which the mold is placed in the cooling device may be indicated. This device, as shown, consists of a base 15, on which is mounted a vertical rack 16, having a slot 17, in which stops 18 and 19 are placed to limit the extreme positions of the said rack. The rack is normally held in its extreme upper position by means of a spring 20, secured at one end to the base 15 and at the other end to the rack 16. The lower end of the rack is bent to form a hook for receiving the ring 13, carried by the rod 12, whereby the rod, core, and mold may be suspended from the rack 16. The weight of these parts draws the rack 16 downward against the action of the spring 20 until stopped by the pin 18. This movement is made slow and regular by means of a dash-pot 21, secured to the base 15 and having a piston whose rod 22 is connected to the rack 16, as shown. The time-indicator consists of a glass 23, containing sufficient sand or other material to indicate the exact number of minutes or seconds during which it is desired to have the mold and core acted upon by the cooling device. The timing-glass is capable of oscillation about a horizontal axis, being secured to a pinion 24, which meshes with the teeth of the rack 16, the arrangement being such that the vertical movement of the rack causes the pinion to oscillate through an arc of one hundred and eighty degrees. Thus when the mold is hung from the rack 16 the same is lowered, and at the same time the glass 23 is oscillated through an angle of one hundred and eighty degrees, and the sand immediately begins to descend into the empty compartment. As soon as the upper compartment is emptied the operator lifts the mold, removing the ring 13 from the rack 16, and the rack is drawn to its upper position by the spring 20. The timing-glass 23 is thus returned to its original position, and the sand descends to the other compartment, thereby providing for a repetition of the operation upon another mold. The operator then unscrews the rod 12 from the core 10 and places the latter upon the mandrel 25. This mandrel is provided with one or more pins 26, which engage slots or recesses in the lower portion of the core. The mandrel and core are then rotated by means of the shaft 27 and hand-wheel 28, while the mold is held against turning by the operator, with the result that the core is unscrewed from the record or blank contained in the mold. The mold containing the said record or blank is then passed along for further treatment. This treatment consists in placing the mold within a water-jacket 29 until the record or blank is shrunk sufficiently to be removed longitudinally from the mold without injury to the surface thereof. The water-jacket 29 is supplied with a cooling medium from the supply-pipe 30 and leaves the same through an outlet-pipe 31. The outlet 31 is connected to the pipes 2 and 7 for supplying the cooling device 1. Thus the cooling medium is used when at its lowest temperature in the water-jacket 29 for cooling the partly-cooled mold and then passes to the cooling device 1 for treating the hot molds. By this means we use the water or other cooling medium in the most efficient manner and are able to reduce the quantity required.

In practicing our invention we do not desire to limit ourselves to the use of the structure illustrated, as our invention may be practiced with any apparatus which is adapted thereto.

What we claim, and desire to secure by Letters Patent, is—

1. The process of removing molded phonograph records or blanks from their molds which consists in using a common cooling medium which is first applied to the partly-cooled mold, and then to the matrix of the hot mold, substantially as set forth.

2. The process of removing molded phonograph-records from their molds, which consists in using a common cooling medium which is first applied to the partly-cooled mold, and then to the interior of the core of the hot mold, substantially as set forth.

3. The process of removing molded phonograph records or blanks from their molds, which consists in using a common cooling medium, which is first applied to the partly-cooled mold, and then simultaneously to the matrix and core of the hot mold, substantially as set forth.

This specification signed and witnessed this 7th day of May, 1904.

WALTER H. MILLER.
ALEXANDER N. PIERMAN.

Witnesses:
 MINA C. MACARTHUR,
 FRANK L. DYER.